United States Patent
Hagano

(10) Patent No.: US 6,902,079 B2
(45) Date of Patent: Jun. 7, 2005

(54) TANK CUP

(75) Inventor: Hiroyuki Hagano, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 138 days.

(21) Appl. No.: 10/216,250

(22) Filed: Aug. 12, 2002

(65) Prior Publication Data

US 2003/0029869 A1 Feb. 13, 2003

(30) Foreign Application Priority Data

Aug. 13, 2001 (JP) ......................................... 2001-245455

(51) Int. Cl.⁷ .......................... B65D 51/16; B65D 51/18
(52) U.S. Cl. ................... 220/303; 220/86.2; 220/259.5; 220/300; 220/304; 220/DIG. 33
(58) Field of Search ................................ 220/300, 303, 220/304, 86.2, 86.1, 259, DIG. 33, 375, 89.1

(56) References Cited

U.S. PATENT DOCUMENTS

| 4,779,755 | A | * | 10/1988 | Harris | 220/203.21 |
|---|---|---|---|---|---|
| 4,887,733 | A | * | 12/1989 | Harris | 220/203.06 |
| 5,395,004 | A | * | 3/1995 | Griffin et al. | 220/295 |
| 5,480,055 | A | * | 1/1996 | Harris et al. | 220/203.26 |
| 5,638,975 | A | * | 6/1997 | Harris | 220/288 |
| 5,732,841 | A | * | 3/1998 | Jocic et al. | 220/203.24 |
| 5,791,507 | A | * | 8/1998 | Harris et al. | 220/203.26 |
| 5,829,620 | A | * | 11/1998 | Harris et al. | 220/203.26 |
| 5,924,590 | A | * | 7/1999 | Jocic et al. | 220/203.24 |
| 6,202,879 | B1 | * | 3/2001 | Gericke | 220/255 |
| 6,273,286 | B1 | * | 8/2001 | Segrest, III | 220/203.26 |
| 6,412,651 | B2 | * | 7/2002 | Tada et al. | 220/288 |

* cited by examiner

Primary Examiner—Lee Young
Assistant Examiner—Niki M. Eloshway
(74) Attorney, Agent, or Firm—Posz Law Group, PLC

(57) ABSTRACT

A tank cap has outstanding operability when the fuel cap opens and closes a tank opening of a fuel tank. The tank cap is provided with a casing main body, a cover body provided with an handle and a torque mechanism. The torque mechanism transmits rotational torque to the casing main body when rotational torque is applied to the handle. A torque release mechanism is also disposed between the handle and a torque plate of the torque mechanism. A torque release mechanism is provided with a steel ball (interposing member) which is in a non-interposed state between the handle and the casing main body when affected by a predetermined or greater inertial force accompanying an external force and the steel ball sets the handle in an idle state when the torque release mechanism is in a non-interposed state.

4 Claims, 17 Drawing Sheets

TANK CUP

BACKGROUND OF THE INVENTION

CROSS REFERENCE TO RELATED APPLICATIONS

This application claims the benefit of and priority from Japanese Application No. 2001-245455 filed August 2001, the content of which is incorporated herein by reference.

1. Field of the Invention

The present invention relates to a tank cap to close a tank opening member.

2. Description of Related Art

In conventional practice, tank caps are configured such that a fuel supply port is closed by rotating a fuel cap fitted with a gasket several times relative to a filler neck connected to a fuel tank. Since rotating the fuel cap a plurality of times sometimes fails to result in a tight fit, closing the fuel supply port of a filler neck with a fuel cap merely by turning the cap through a predetermined angle (for example, about 90°) has been proposed as a way of overcoming this shortcoming. However, it was problematical in that when it was subjected to a great external force from a collision and the like, it readily became loose after it was closed.

The lost motion mechanism is well known as a technique which prevents loosening of this type of fuel cap. The lost motion mechanism referred to here is a mechanism which is provided with a casing with a gasket is mounted and a handle mounted on the casing and becomes slack which permits the handle to rotate on the casing.

However, the lost motion mechanism was not only complex but when the fuel cap was removed, it was necessary to further rotate it to compensate for the lost motion and it had poor operability.

SUMMARY OF THE INVENTION

The object of the present invention is to provide a tank cap with simple structure which improves the operation for opening and closing the tank opening and ensures the high sealing properties when an external force is applied to the cap.

In order to attain at least part of the above and other related objects of the present invention, there is provided a tank cap that opens and closes a tank opening and engages with an opening engagement element disposed on a circumference of the tank opening. The tank cap comprises a casing main body, which is configured to seal the tank opening, the casing main body including a casing engagement element configured to engage with the opening engagement element via rotation of the casing main body by a predetermined angle; a handle rotatably mounted on the casing main body; a coupling mechanism includes a torque mechanism and a transmission torque release mechanism, which are interposed between the handle and the casing main body, the torque mechanism transmitting a rotational torque applied to the handle to the casing main body; and the transmission torque release mechanism having: (i) a torque transmission state in which the rotational torque of the coupling mechanism is transmitted to the casing main body, and (ii) a torque non-transmission state in which the rotational torque of the coupling mechanism is not transmitted to the casing main body. The transmission torque release mechanism has an interposing member, the interposing member being configured to shift the transmission torque release mechanism from the torque transmission state to the torque non-transmission state when the interposing member is subjected to a predetermined or greater inertial force resulting from an external force, thereby placing the handle against the casing main body in an idle state.

In the tank cap of the present invention, when rotation operations are applied to the handle, the rotational torque of the handle is transmitted to the casing main body via the coupling mechanism and the casing main body reaches the closing position.

In addition, when an inertial force accompanying a large external force arises around the cap device due to a collision with an automobile and the like, the torque release mechanism releases the engagement with the coupling mechanism. In other words, when the interposing member of the torque release mechanism is subjected to a predetermined or greater inertial force, the space between the handle and the casing main body is moved to a non-interposing state and the handle is set in an idle state. As a result, even if the handle is subjected to an external force accompanying a collision and the like, the rotational torque is not transmitted to the casing main body via the coupling mechanism and ensures the high sealing properties.

In preferred embodiments of the invention, the coupling mechanism includes a torque mechanism which transmits the rotational torque within a predetermined range. The torque mechanism includes a handle engagement element disposed on a lower portion of the handle a torque plate interposed between the handle and the casing main body, the torque plate having a plate engagement element configured to engage with the handle engagement element and wherein the interposing member is configured such that the handle engagement element and the plate engagement element are engaged in the torque transmission state, and the handle engagement element and the plate engagement element are disengaged in the torque non-transmission state.

In another preferred embodiments of the invention, the transmission torque release mechanism includes a spring interposed between the handle and the torque plate, the spring being configured to generate a pressing force to the torque plate toward the torque non-transmission state of the coupling mechanism.

In preferred embodiments of the invention, the interposing member is a ball.

In preferred embodiments of the invention, the transmission torque release mechanism is configured such that an interval between the torque plate and casing main body is decreased by the pressing force when the coupling mechanism shifts from the torque transmission state to the torque non-transmission state.

Other preferred embodiments of the fragile portion is constructed and arranged to be the transmission torque release mechanism includes a locating recess formed on an upper portion of the casing main body for supporting a lower portion of the ball and a support portion formed on a lower portion of the torque plate for supporting an upper portion of the ball, the locating recess and the support portion being configured to hold the ball in the torque transmission state and to release the ball in the torque non-transmission state.

In preferred embodiments of the invention, the transmission torque release mechanism is configured such that the ball is maintained in a space between the torque plate and the casing main body when the ball is released from the locating recess.

In preferred embodiments of the invention, the transmission torque release mechanism includes a guide curved member formed around the locating recess, the guide curved member being configured to return the ball on the locating recess when the interval between the torque plate and the casing main body is increased from that in the torque transmission state.

In preferred embodiments of the invention, the transmission torque release mechanism includes a spring interposed between the torque plate and the casing main body, the spring being configured to generate a pressing force to the torque plate toward the torque non-transmission state of the coupling mechanism.

In preferred embodiments of the invention, the interposing member includes a fragile portion which is broken by an external force, the interposing member being configured to shift from the torque transmission state to the torque non-transmission state when the fragile portion is broken.

The tank cap further comprises a tether connecting the tank cap to an outer plate of a vehicle.

These and other objects, features, aspects, and advantages of the present invention will become more apparent from the following detailed description of the preferred embodiments with the accompanying drawings.

DETAILED DESCRIPTION OF PREFERRED EMBODIMENTS

Figure 1:
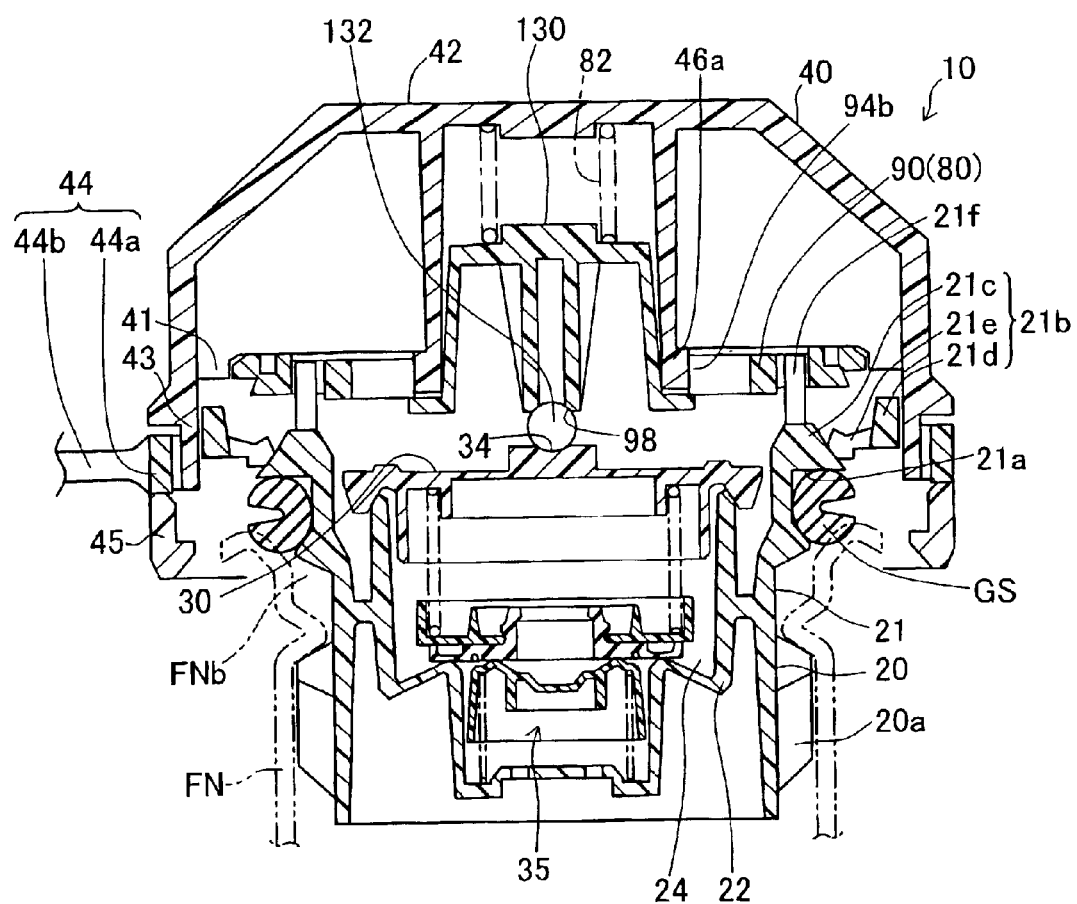
FIG. 1 is a cross sectional view showing a tank cap apparatus with a fuel cap according to a first embodiment of the present invention.

FIG. 1 is a cross-sectional view showing a tank cap apparatus with a fuel cap 10 (tank cap) according to a first embodiment of the present invention. In FIG. 1, the fuel cap 10 is mounted on a filler neck FN having a fueling inlet FNb (tank opening) for supplying fuel to a fuel tank not shown in the figure. The fuel cap 10 comprises a casing main body 20 made of a resin material such as polyacetal resin; a cover 40 having a handle and formed of a resin material such as nylon and mounted on an upper part of the casing main body 20; an inner cover 30 defining the a valve chamber 24 by closing an upper opening of the casing main body 20; a pressure regulating valve 35 accommodated in the valve chamber 24; a torque mechanism (coupling mechanism) 80; and a gasket GS mounted on an upper portion of the casing main body 20 for sealing against the filler neck FN.

The fuel cap 10 is provided with a torque release mechanism 130 which places the cover body 40 in an idle state when impacted by a large external force due to a collision and the like.

The elements of the tank cap 10 in the embodiment are described in detail below. The casing main body 20 comprises a substantially cylindrical outer tubular body 21 with a casing engagement element 20a which engages with an inner circumference of the filler neck FN, and a valve chamber forming body 22 provided on an inner side of the outer tube 21. The valve chamber forming body 22 accommodates a positive pressure valve and a negative pressure valve which together operate as a pressure control valve. The inner cover 30, which is welded to an upper portion of the valve chamber forming body 22 by ultrasonic welding, covers the valve chamber 24.

The gasket GS is mounted on a lower surface of a flange part 21b formed on an upper portion of the casing main body 20. The gasket GS is interposed between a seal support 21a of the flange part 21b and the fueling inlet FNb of the filler neck FN and, when the fuel cap 10 is tightened down on the fueling inlet FNb, the gasket GS pushes against a seal surface of the fueling inlet FNb and providing a seal.

Figure 3:
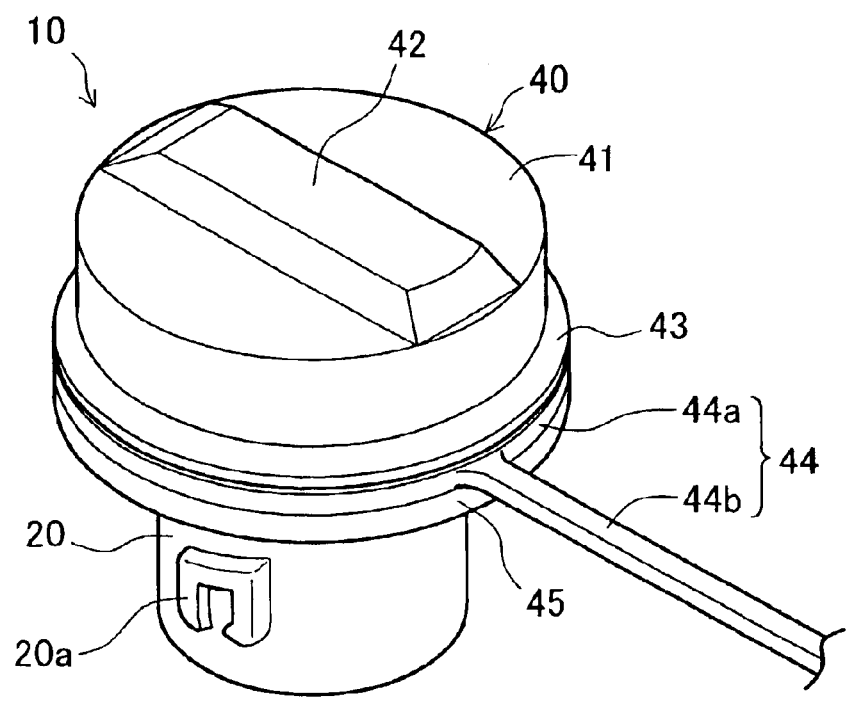
FIG. 3 shows the relationship between a casing engagement element of a casing main body and a filler neck.
Figure 3:
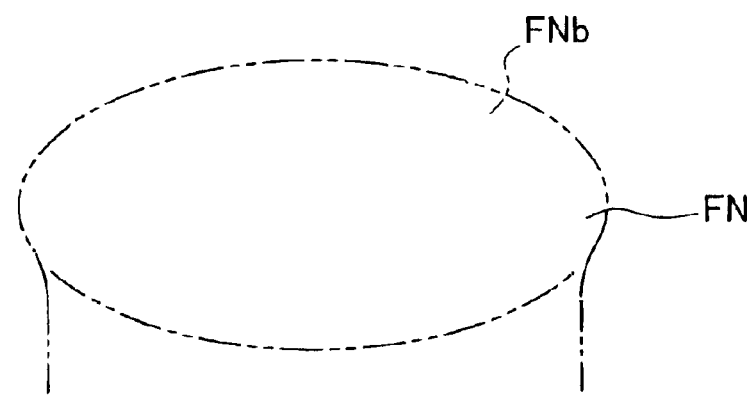
Figure 3:
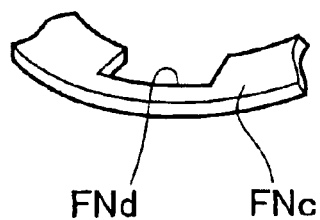

FIG. 3 shows the relationship between the casing engagement element 20a of the casing main body 20 and the filler neck FN. As shown in FIG. 3, an opening engagement element FNc is formed on the inner circumference of the filler neck FN. On one part of the inner circumference of the opening engagement element FNc, a neck insertion notch FNd is formed, enabling insertion of the casing engagement element 20a in the axial direction. As a result, in the state where the casing engagement element 20a is aligned to neck insertion notch FNd and the fuel cap 10 is inserted into the filler neck FN, the fuel cap 10 is rotated the predetermined angle (approximately 90 degrees), the casing engagement element 20a engages with the opening engagement element FNc, and in this way, the fuel cap 10 is attached to the filler neck FN.

As shown in FIG. 1, the flange part 21b comprises an inner annularly shaped part 21c formed on the upper part of outer tube 21, an outer annularly shaped part 21d positioned toward the outside of the inner annularly shaped part 21c, and connecting parts 21e which connect the inner annularly shaped part 21c and the outer annularly shaped part 21d at four points along the circumferential direction.

The cover 40 is rotatably mounted on the flange part 21b. The cover 40 comprises an upper wall 41, a handle 42 formed protrudingly from the upper surface of the upper wall 41, and a side wall 43 formed at the outer circumference of the upper wall 41, and is integrally formed by injection molding of electrically conductive resin. In addition, on the inside of the side wall 43, eight engaging protrusions (not shown) are formed at a distance equally along the circumferential direction of the cover 40. The engaging protrusions engage with the outer annularly shaped part 21d of the flange part 21b, and the cover 40 is thus assembled to the casing main body 20.

A tether 44 is also mounted on the retainer ring 45 which is supported on the side wall 43. The tether 44 comprises a ring 44a supported rotatably on the side wall 43 and a long material 44b extending from one end of the ring 44a. The other end of the long material 44b is attached to a fueling lid (not shown in figure).

Figure 4:
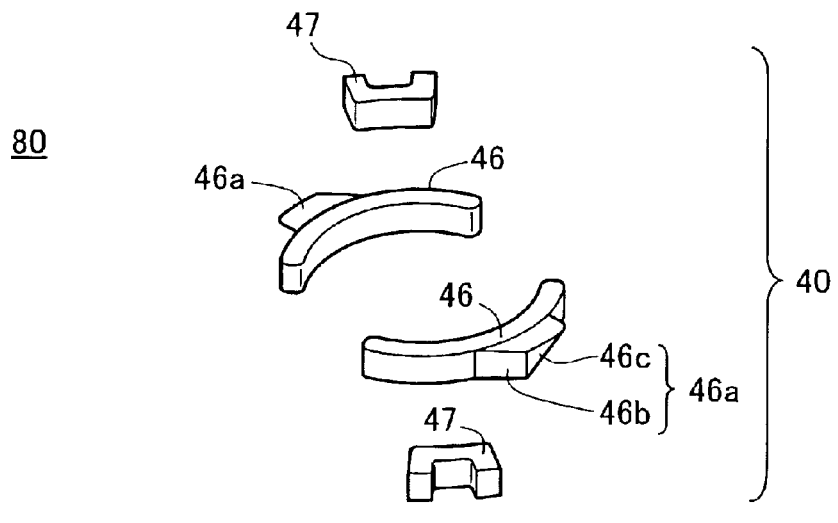
FIG. 4 is an oblique-view showing a torque mechanism interposed between a handle and an upper portion of the casing main body.
Figure 4:
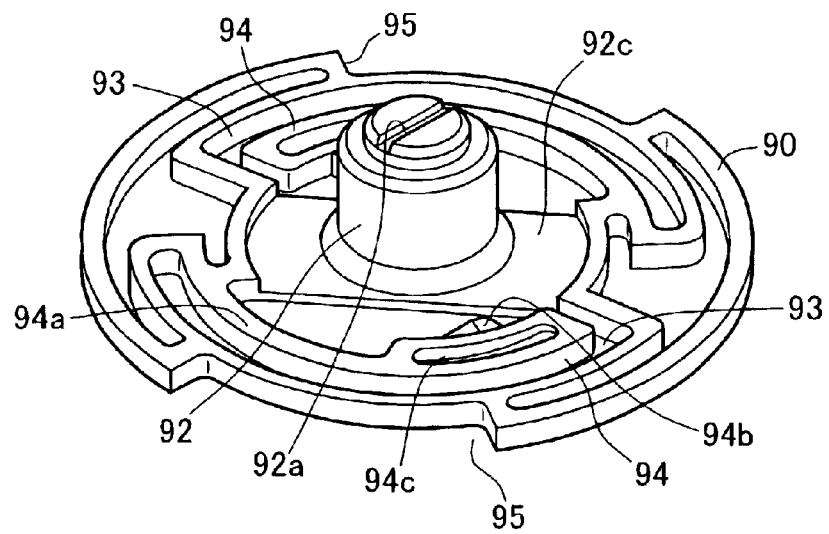
Figure 4:
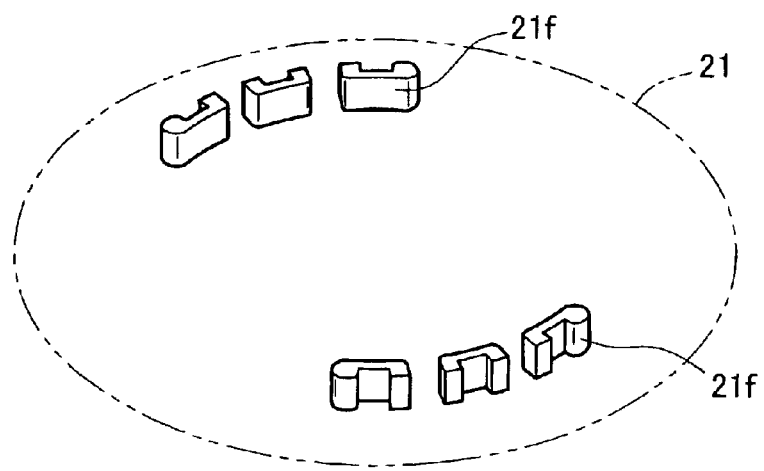
Figure 5:
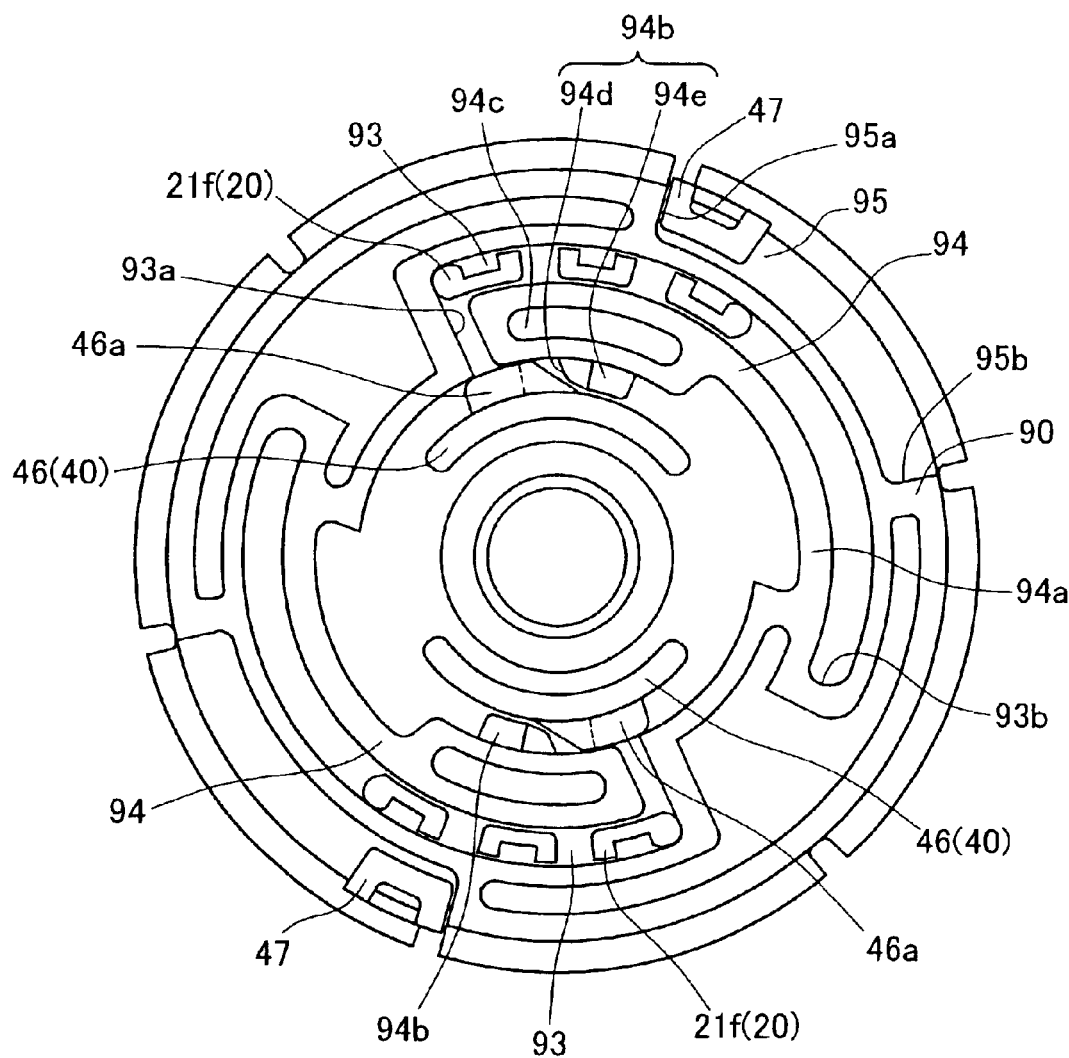
FIG. 5 is a descriptive view showing the torque mechanism viewed from above.

FIG. 4 is an oblique view showing the torque mechanism 80 interposed between the cover 40 and the upper portion of the casing main body 20 and FIG. 5 shows the torque mechanism 80 viewed from above. The torque mechanism 80 gives the user a feeling of attachment by an audible click when the rotational torque of a predetermined level or more is applied to the cover 40 when closing the fuelling inlet FNb with the tank cap 10 (see FIG. 3). The user can thus confirm that the tank cap 10 is attached to the filler neck FN with the rotational torque of the predetermined level or more.

As shown in FIG. 4 and FIG. 5, the torque mechanism 80 includes main body ribs 21f and 21f separated in three ribs and formed upward from the upper surface of the outer tube 21, a handle engagement elements 46a and 46a formed on the arc-shaped turning parts 46, and handle trigger protrusions 47 and 47. The torque mechanism 80 further comprises a first spring 82 and a second spring 83, as shown in FIG. 1, and a torque plate 90.

Figure 6:
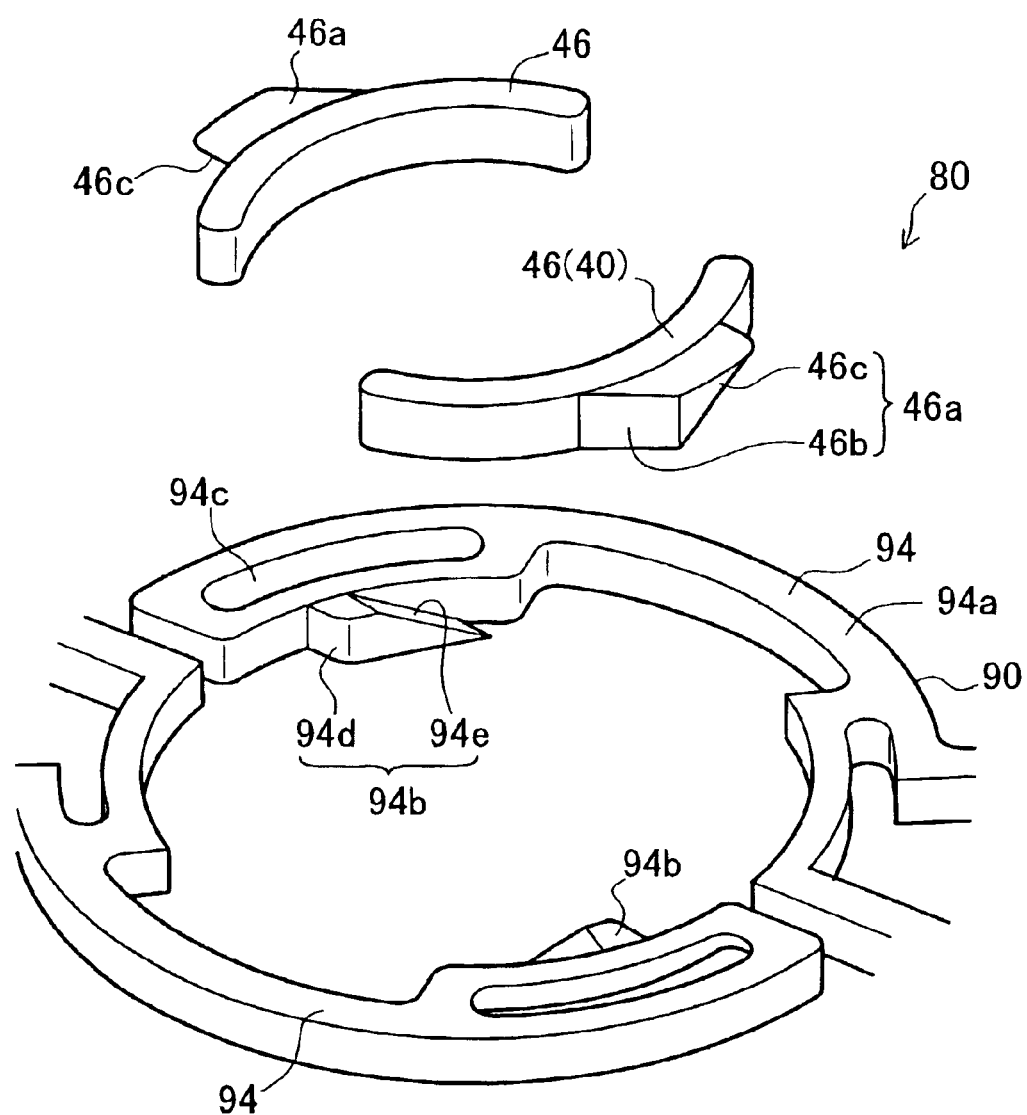
FIG. 6 is a partial enlarged oblique view of FIG. 4.

In other words, in the central part of the inner side of the cover 40, the arc-shaped turning parts 46 and 46 are protrudingly formed and, on the outer periphery of the arc-shaped turning parts 46 and 46, the handle engagement elements 46a and 46a are protrudingly formed. FIG. 6 is a partial oblique view enlarged in FIG. 4. As shown in FIG. 6, a side surface of the handle engagement elements 46a is formed as an engaging vertical surface 46b which is formed vertically. A lower face of the handle engagement element 46a is formed as an engaging inclined surface 46c which is inclined by a predetermined angle relative to the axis of the fuel cap 10.

In addition, on the outer periphery of the inner face of the cover 40 shown in FIG. 4, arc shaped handle trigger protrusions 47 and 47 are protrudingly formed. The handle engagement elements 46a and 46a and the handle trigger protrusions 47 and 47 are formed on the cover 40 symmetrically centered on the axis of the cover 40.

Referring to FIG. 5, the torque plate 90 is a thin disk made of resin and has a central protruding part and guides slots. The torque plate 90 has a cup shaped spring containing protruding part 92(see FIG. 1), a pair of rib guide 93 and 93 arranged concentrically with the protruding part 92, and a pair of trigger guide slots 95 and 95. On the outer periphery of the spring containing protruding part 92, the arc-shaped turning parts 46 of the cover 40 are positioned and also at the outer edge of the parts 46, elastic torque pieces 94 and 94 are disposed. Each elastic torque pieces 94 is a cantilever arc piece that extends from a support end 94a, and has a torque piece engagement element 94b that protrudes toward the center of the torque plate 90 and a slot 94c formed on the outer circumferential side of the torque piece engagement element 94b. The elastic torque piece 94 is elastically deformed to narrow the slot 94c, when the torque piece engagement element 94b is pressed against the handle engagement element 46a of the cover 40. The spring containing protruding part 92 has connecting parts 92c extending on opposing sides therefrom. The connecting parts 92c connect the protruding part 92 with the base of the elastic torque pieces 94 and 94.

As shown in FIG. 6, the torque piece engagement element 94b has an engaging vertical surface 94d and an engaging inclined surface 94e. The engaging vertical surface 94d is formed so as to contact the handle engagement vertical surface 46b perpendicularly with respect to the rotational direction of the torque plate 90 when the handle engagement element 46a pushes the torque piece engagement element 94b from the center to the radial direction due to the closing operation, and then the torque piece engagement element 94b elastically deforms to narrow the slot 94c narrowed (see FIG. 10).

On the other hand, the engaging inclined surface 94e is formed to contact the engaging inclined surface 46c when the handle engagement element 46a pushes the torque piece engagement element 94b due to movement of the opening direction, and the torque piece engagement element 94b elastically inclined downward at fulcrum of the support end 94a.

In FIG. 5, the main body ribs 21f and 21f are each inserted into the rib guides 93 and 93 disposed peripherally from the elastic torque pieces 94 and 94. Each of the main body ribs 21f moves back and forth between a first end 93a and a second end 93b which are the two ends of the rib guide 93. Likewise, the handle trigger protrusions 47 and 47 are inserted into the trigger guide slots 95 and 95. Each handle trigger protrusion 47 moves back and forth between a first end 95a and a second end 95b which are two ends of the trigger guide slot 95.

In FIG. 1, the spring 82, used as a torsion springs, are disposed connectively between the cover 40 and the torque plate 90. That is, the spring 82 is spanned between a fixing stopper 48 formed on the center of the lower surface of the cover 40, and a fixing stopper 92a formed on the upper wall of the spring containing protruding part 92. In this way, when the cover 40 is rotated in the clockwise direction relative to the torque plate 90, the spring 82 accumulates spring force.

A torque release mechanism 130 is placed between the cover body 40 and the torque plate 90. The torque release mechanism 130 is a mechanism which can be switched so that the rotational torque of the cover body 40 can be transmitted or not transmitted to the casing body 20 via the torque mechanism 80. The torque release mechanism 130 comprised a steel ball 132 (interposing member) and the spring 82 mentioned previously. The steel ball 132 is supported on the lower support surface 34 which protrudes onto the upper portion in the middle of the inside cover 30. The spring 82 is supported between the lower support surface 34 and the upper side support surface 98 by energizing the steel ball 132 in a downward direction.

When the steel ball 132 is subjected to a predetermined or greater inertial force due to an external force and when the ball 132 is removed from the lower support surface 34, the spring 82 moves the torque plate 90 downward. Thus, the torque release mechanism 130 goes into a state wherein the cover body 40 is release from the torque plate 90 and goes into an idle state. The relationship between the torque release mechanism 130 and the torque mechanism 80 will be explained later on.

Figure 12:
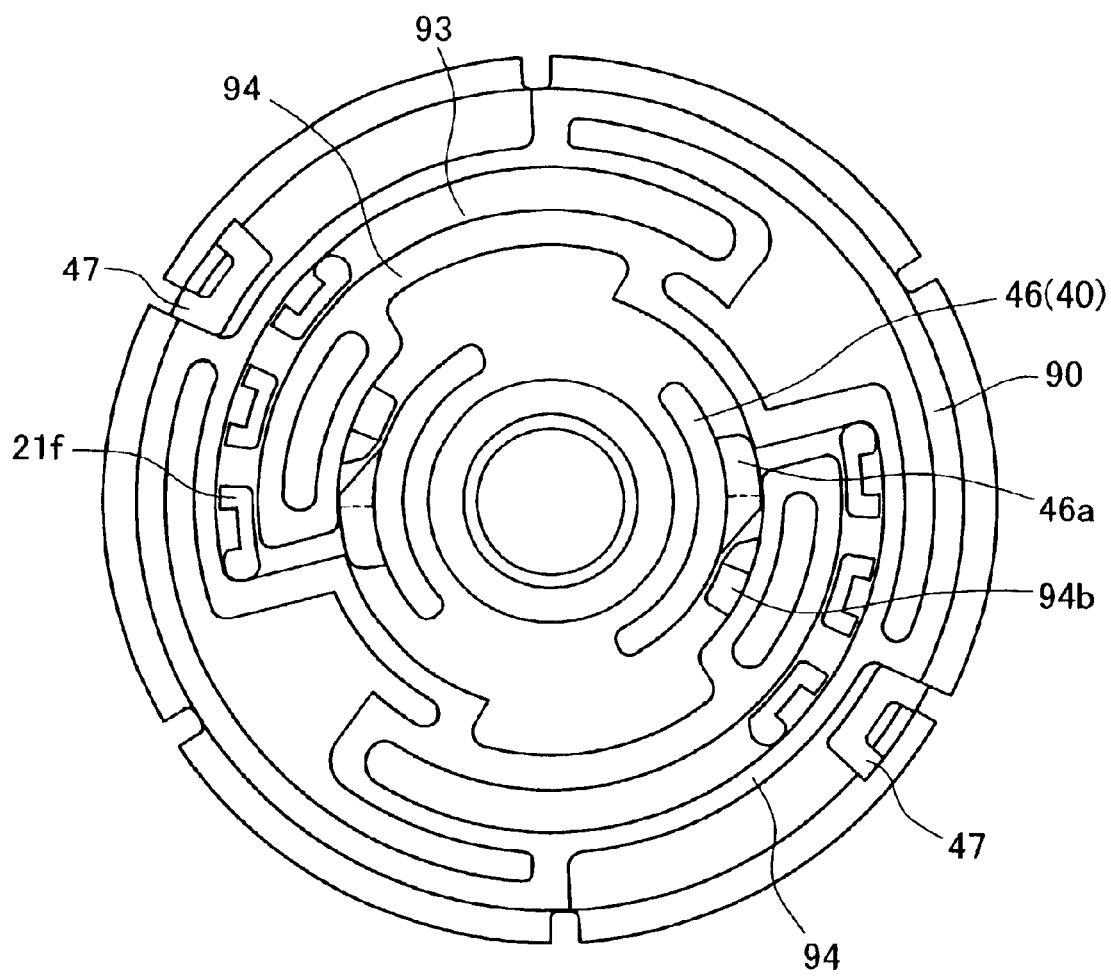
FIG. 12 shows the action continuing from that of FIG. 11.
Figure 13:
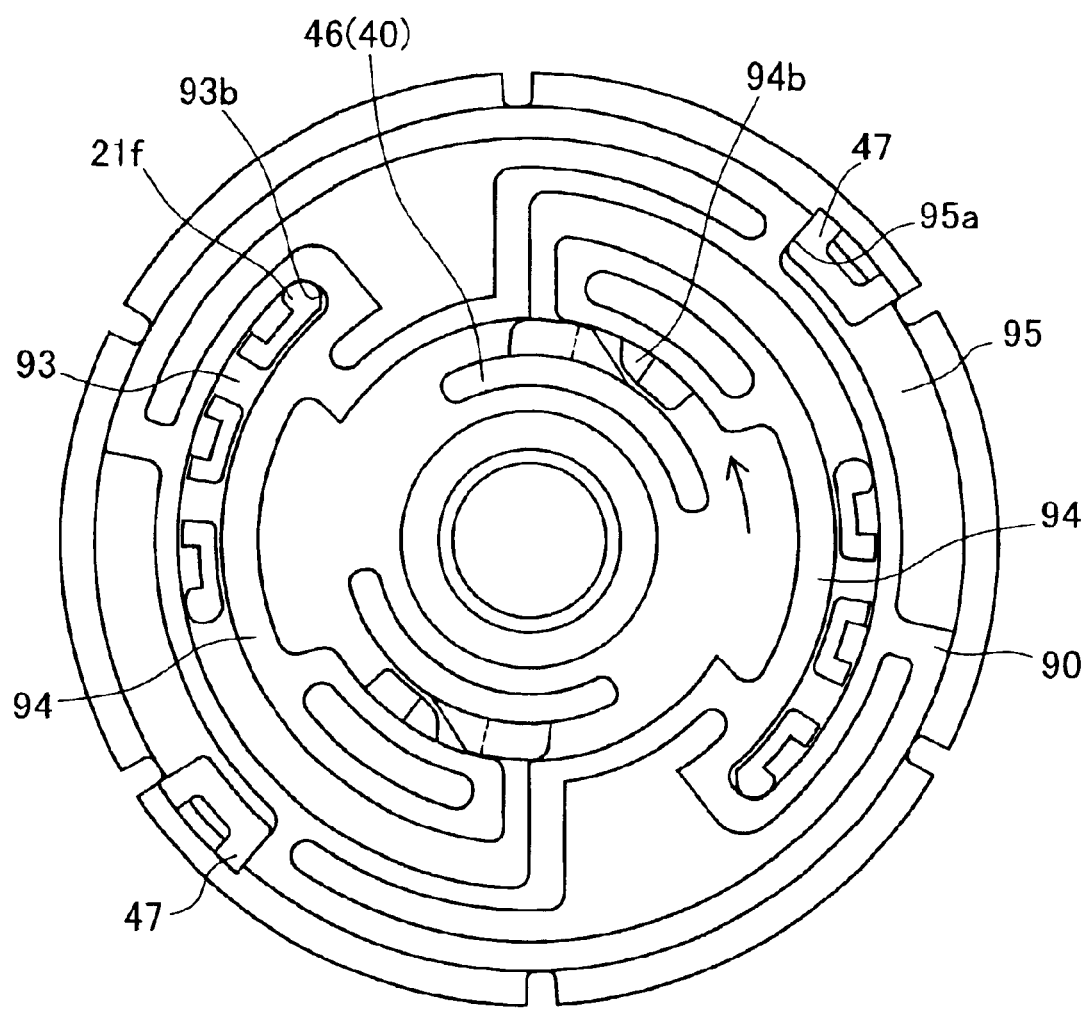
FIG. 13 shows the action continuing from that of FIG. 12.
Figure 14:
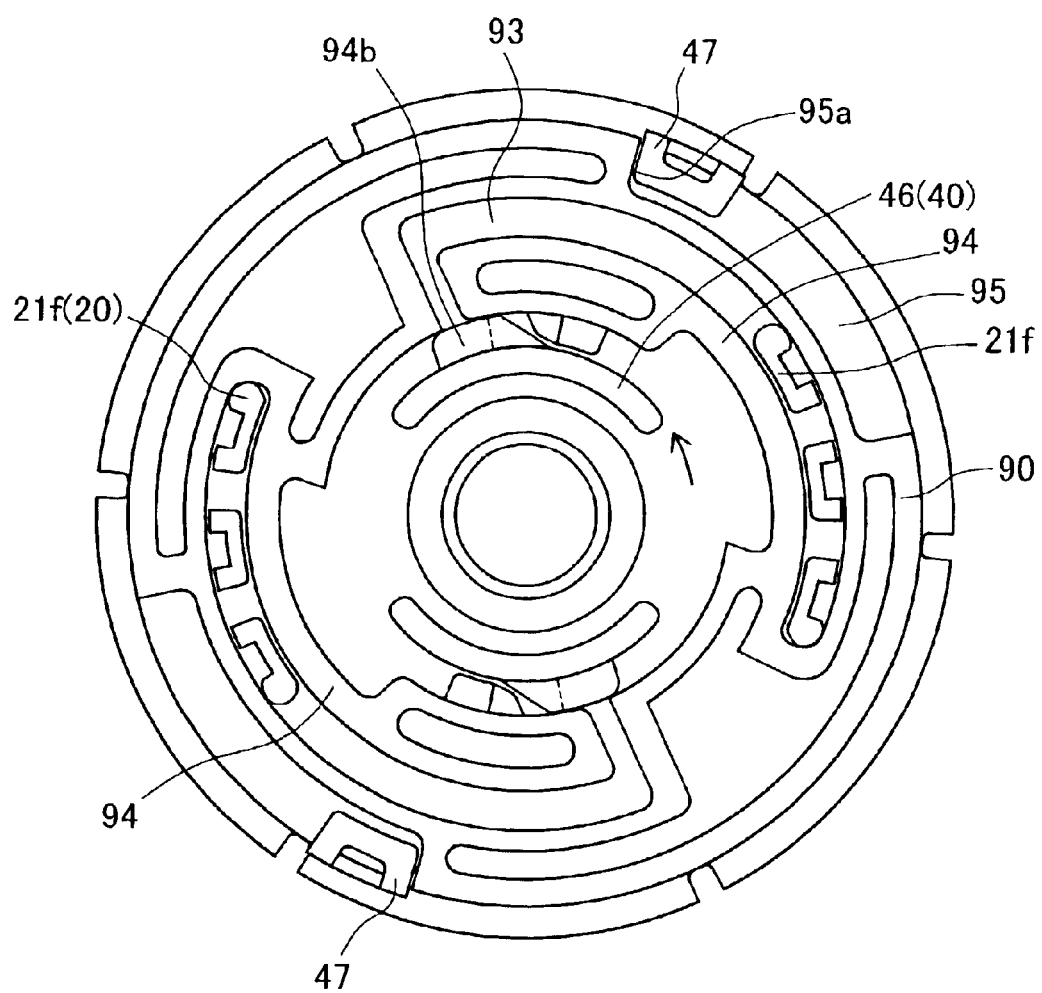
FIG. 14 shows the action continuing from that of FIG. 13.

The following describes operation of the torque mechanism 80 in the process of opening and closing the fuelling inlet FNb of the filler neck FN with the tank cap 10. FIGS. 8 through 12 show the operation through completion of closing operation with the fuel cap 10 while FIGS. 12 through 14 show the opening operation. Because the torque mechanism 80 has two each of the elastic torque pieces 94, etc. symmetrically formed around the rotational axis of the cover 40, the upper parts of each view are explained mainly.

Figure 8:
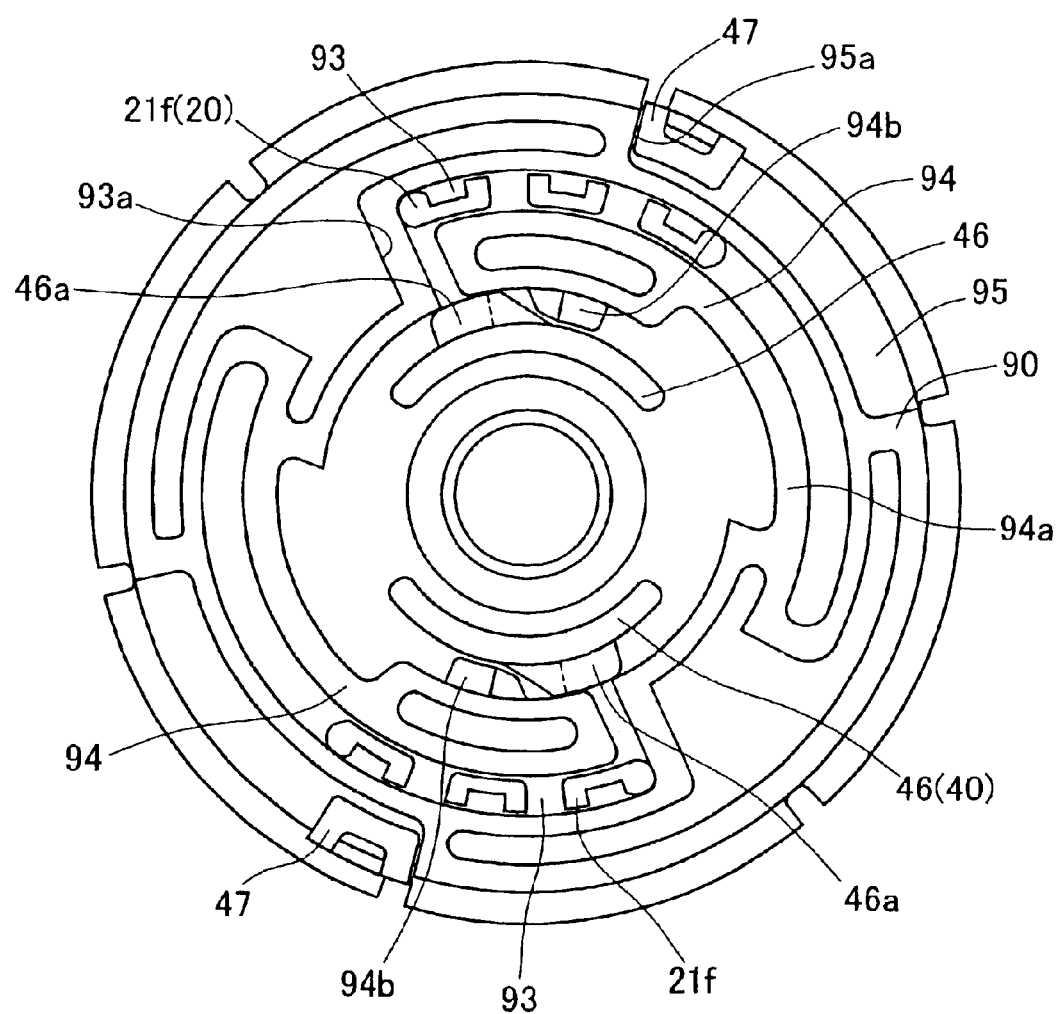
FIG. 8 shows the action of the torque mechanism of the fuel cap.
Figure 9:
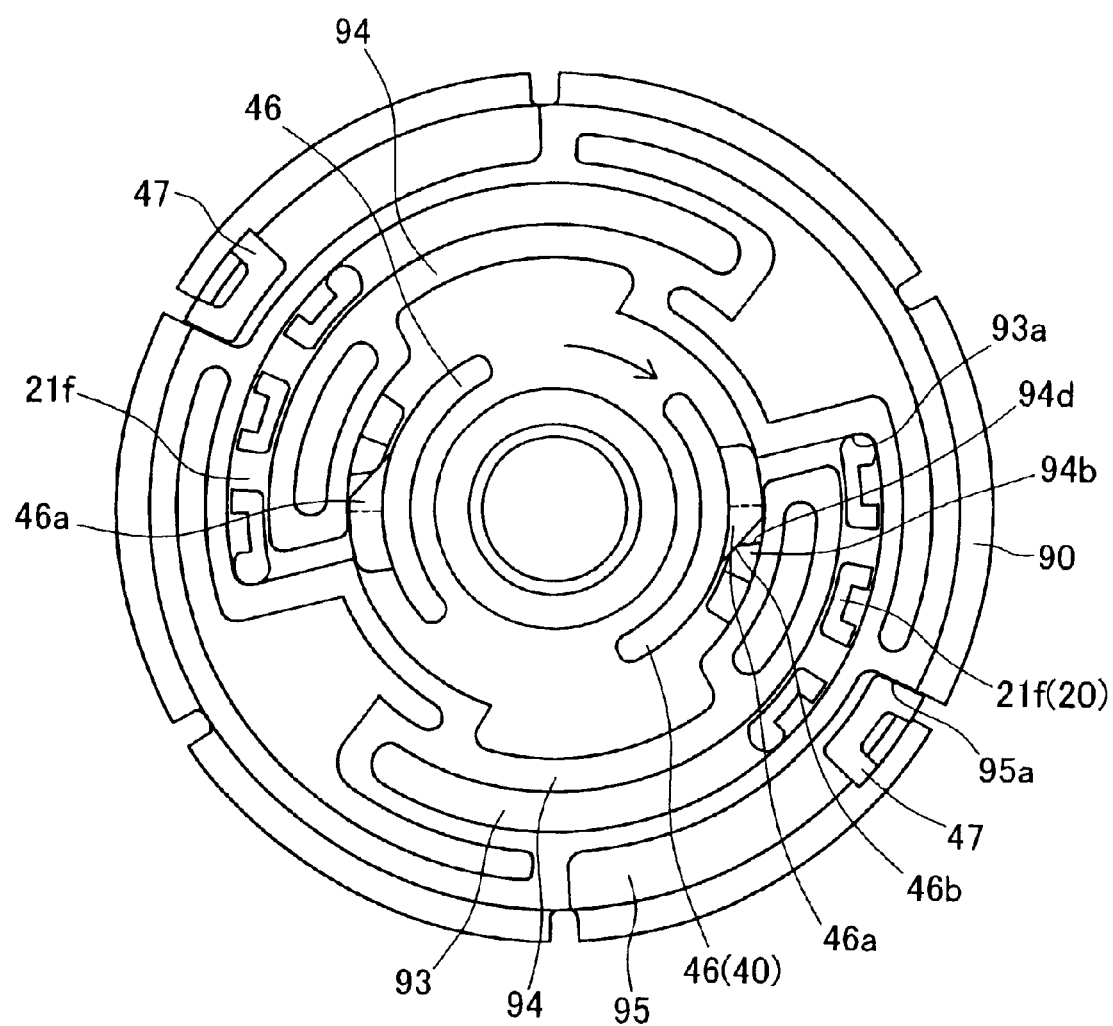
FIG. 9 shows the action continuing from that of FIG. 8.

As shown in FIG. 3, in the state where the fueling inlet FNb is open, the handle 42 is gripped with the thumb and index finger and, aligning the casing engagement element 20a of casing main body to the neck insertion notch FNd of the filler neck FN, the casing main body 20 is inserted in the fueling inlet FNb in the axis direction. In this case, by pointing the handle 42 in the perpendicular direction, the casing engagement element 20a and the neck insertion notch FNd will be aligned in a position that enables insertion of the casing main body 20. This positioning relationship enables the fuel cap 10 to be affixed easily. As shown in FIG. 8, the positional relationship of the torque mechanism 80 is that the main body rib 21f is pushed against the first end 93a, and the handle engagement element 46a contacts the torque piece engagement element 94b of the torque plate 90.

Figure 10:
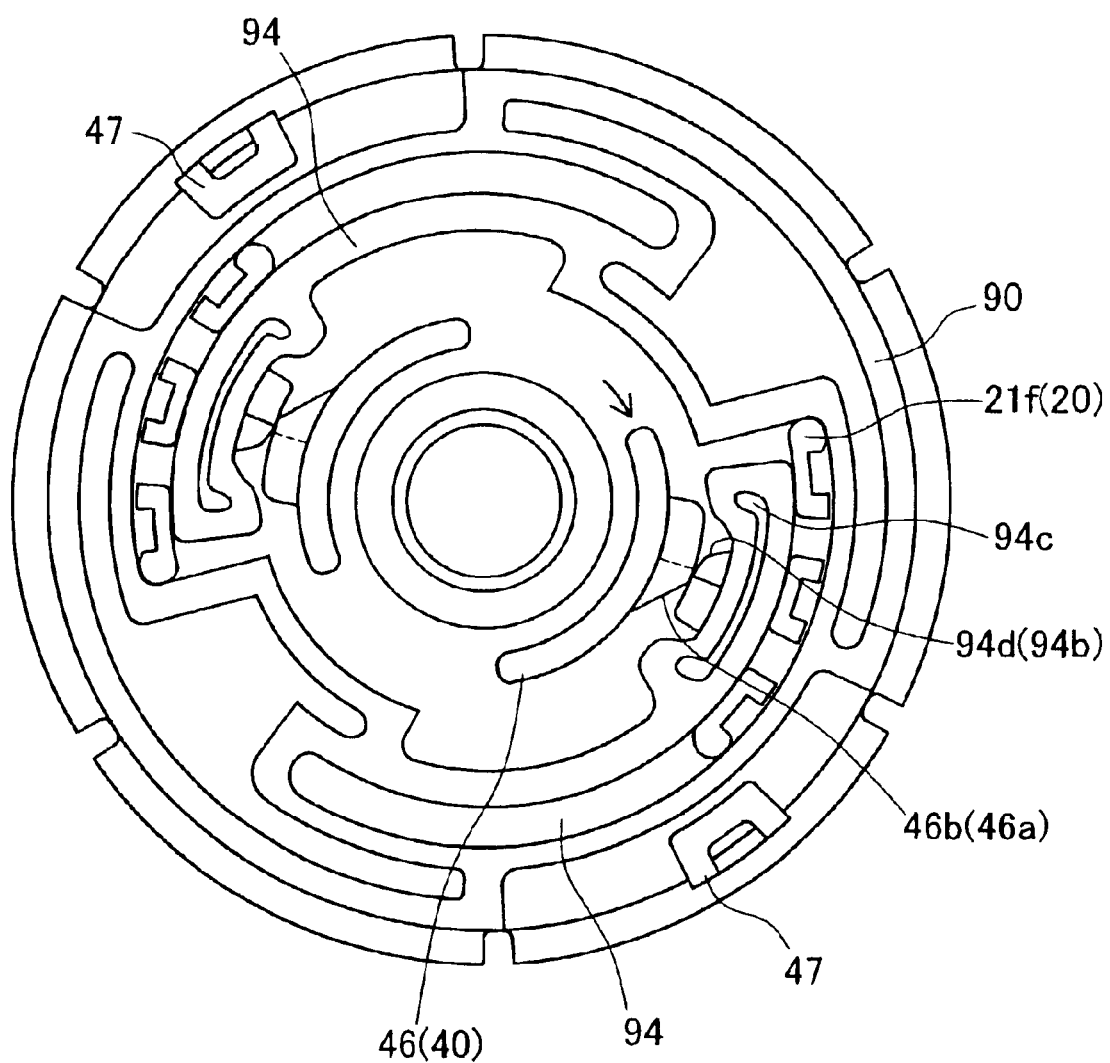
FIG. 10 shows the action continuing from that of FIG. 9.

From this state, to perform the closing operation, applying rotating force to the cover 40 in the clockwise direction, the torque mechanism 80 executes a sequence of actions as shown in FIGS. 9, 10, 11, and 12. That is, the clockwise direction rotating force applied to the cover 40 rotates the torque plate 90, through the engagement of the handle engagement element 46a of the cover 40 with the torque piece engagement element 94b of the torque plate 90, rotating the torque plate 90 in the same direction. Accompanying the rotation of the torque plate 90, the main body rib 21f of the casing main body 20 is pushed by the first end 93a of the torque plate 90. As a result, the cover 40, the torque plate 90, and the casing main body 20 rotate as one unit, proceeding in the direction of closing the fueling inlet FNb, and the force with which the casing engagement element 20a engages with the opening engagement element FNc increases. Then, when the reaction force generated by this engaging force exceeds the predetermined rotational torque, as shown in FIG. 10, the handle engagement element 46a rides over the torque piece engagement element 94b, and goes into the first disengagement state of FIG. 11.

Figure 7A:
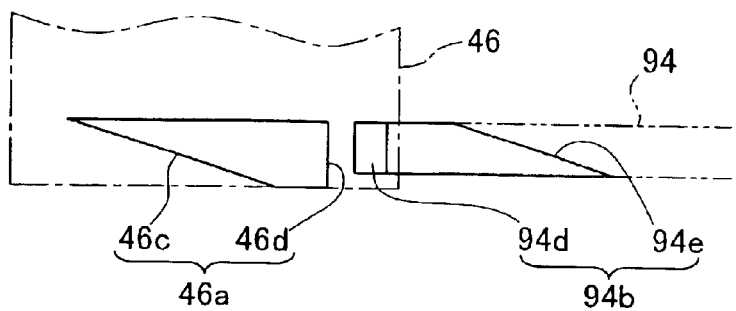
FIG. 7A, FIG. 7B, FIG. 7C and FIG. 7D show the operation and effect of the torque mechanism.
Figure 7B:
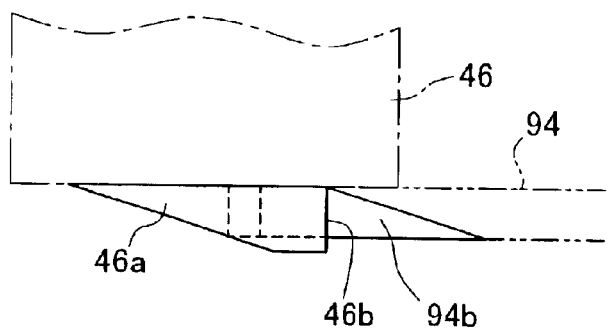
Figure 7C:
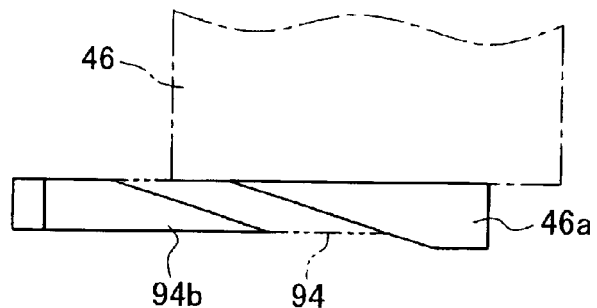

At this time, because the handle engagement vertical surface 46b of the handle engagement element 46a pushes on the engaging vertical surface 94d in the radial direction, the elastic torque piece 94 elastically deforms, changing the width of the slot 94c. In this case, as shown in FIG. 7A and 7B, the elastic torque piece 94 maintains its position in the horizontal plane. Upon passing through first non-engaged state, the user can confirm a feeling of moderated resistance. In this way, the fuel cap 10 goes into the state where the fueling inlet FNb has been closed with the predetermined tightening torque.

In this way, when the handle engagement element 46a rides over the torque piece engagement element 94b, in other words, when the cover 40 turns relative to the torque plate 90, the spring 82 spanning is also wound by approximately 30 degrees and accumulates the pressing force.

Figure 7D:
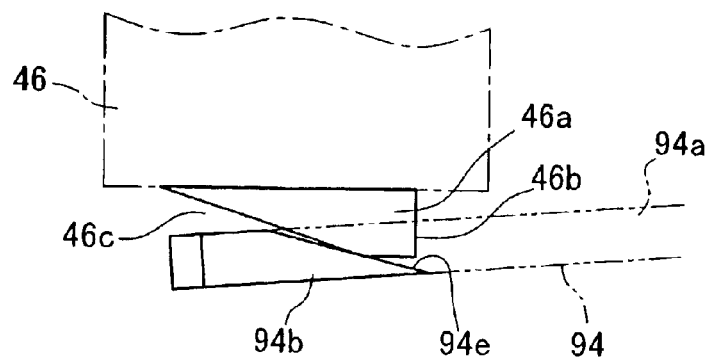

Then, the pressing force accumulated in the spring 82 causes the cover 40 to rotate in the counter-clockwise direction when the operator's hand releases the handle 42 (FIG. 3). When the pressing force in the spring 82 turns the cover 40 in the counter-clockwise direction as shown in FIG. 7D, the engaging inclined surface 46c of the handle engagement element 46a, following the engaging inclined surface 94e of the torque piece engagement element 94b, pushes the elastic torque piece 94 downward with the support end 94a. Then, the handle engagement element 46a easily rides over the torque piece engagement element 94b and goes into the second non-engaged state (the state shown in FIG. 12).

That is, the handle engagement element 46a rides over torque piece engaging using a smaller rotational torque than that for the case of tightening the fuel cap 10. At this time, the cover 40 itself returns in the counter clockwise direction and the handle 42 returns to a position of approximately 100 degrees. In this state, the fuel cap 10 has closed the fueling inlet FNb.

Further, since the handle trigger protrusions 47 makes contact with the second end 95b of the torque plate 90 and since second end 93b on the torque plate 90 also makes contact with the main body rib 21f, no lost motion is generated.

Figure 11:
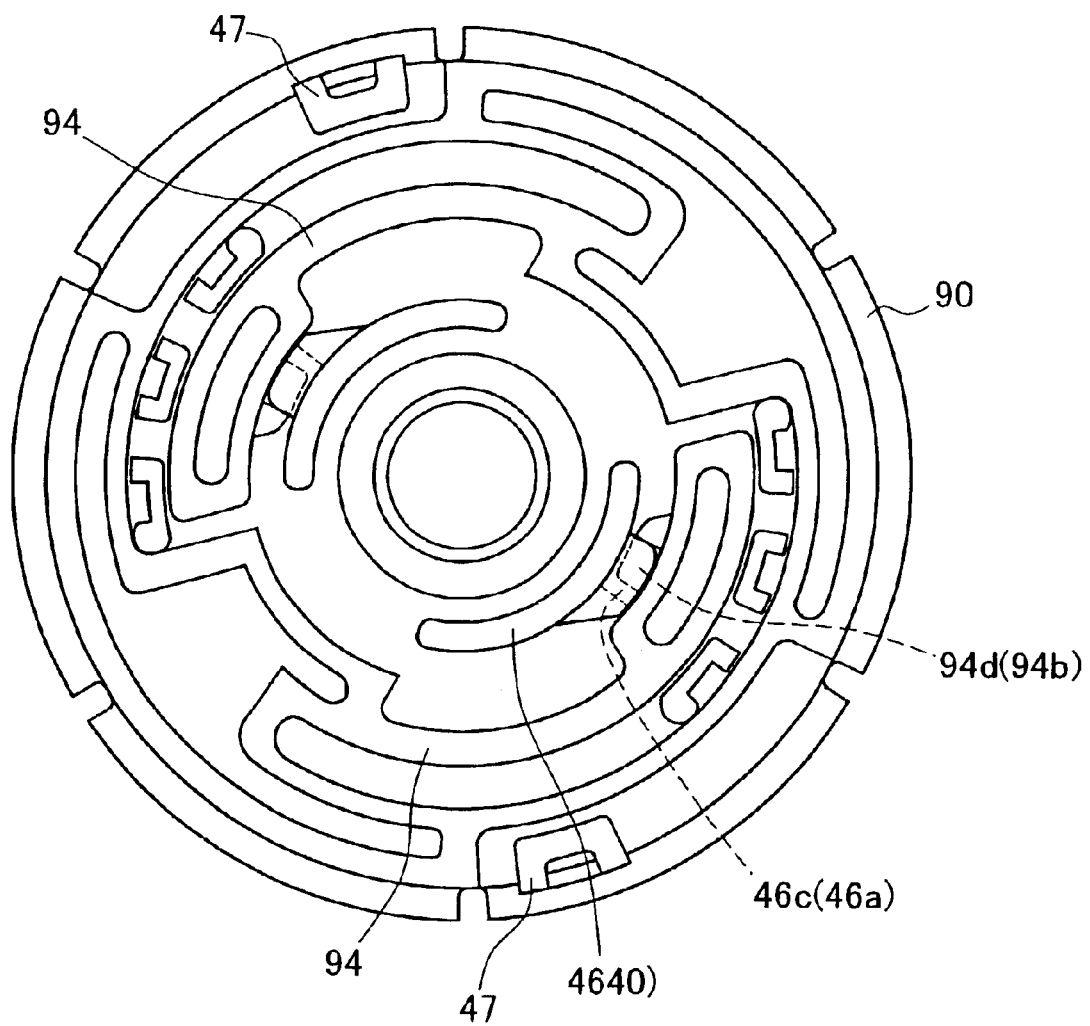
FIG. 11 shows the action continuing from that of FIG. 10.

On the other hand, to open the fuel cap 10, the handle 42 of the cover 40 is gripped with the fingers and rotating pressure is applied to turn it in the counter-clockwise direction from the state shown in FIG. 11. In this way, the handle trigger protrusion 47 presses against the first end 95a of the trigger guide slot 95 and linked to the cover 40, the torque plate 90 rotates.

When the main body rib 21f comes into contact with the second end 93b, the rotational force applied to the cover 40 is transmitted via the handle trigger protrusion 47, the torque plate 90, the second end 93b, the main body rib 21f, and the casing main body 20, and the cover 40, the torque plate 90 and the casing main body 20 rotate in the counter-clockwise direction as one unit.

When the casing main body 20 has rotated 90 degrees as one unit with the cover 40 (the state of FIG. 13), the casing engagement element 20a disconnects from opening engagement element FNc of the filler neck FN and is released from the restraining force relative to the filler neck FN.

Next, the fuel cap 10 can be removed from the filler neck FN by pulling out the cover body 40 in the axis direction.

In this way, in the operating sequence for tightening the fuel cap 10, when the handle engagement element 46a rides over the torque piece engagement element 94b of the torque plate 90, a feeling of reduced resistance could be confirmed and it was clear that the fuel cap 10 had been tightened with the predetermined value of torque. Thus, regardless of the elasticity of parts such as the gasket GS, the cap 10 can be tightened down with a set torque.

Moreover, since the fuel cap 10, through the engagement of the casing engagement element 20a and opening engagement element FNc, need only operate through the small rotational angle of approximately 90 degrees, the action of rotating the cap multiple turns is not needed and the operation of mounting and tightening the cap is easy.

Since, after tightening the fuel cap 10, when the user releases his grip from the handle 42 and the cap 10 goes into second non-engaged state through the pressing force of the second spring 83. Then, as shown in FIG. 7D, the engaging inclined surface 46c of the handle engagement element 46a pushes on the engaging inclined surface 94e of the torque piece engagement element 94b, and the elastic torque piece 94, in the piece holding state, deforms in the downward direction under just a small force. As a result, the cover 40 can return from the first non-engaged state to the second non-engaged state under a small force, making it easy to return the to second non-engaged state and enabling reduction of the noise produced at that time. Moreover, upon completion of tightening down of the cap, since the cap 20 is returned to the second non-engaged state through the pressing force of the second spring 83, when the user opens the cap, the noise usually generated by the operation of rotating the cap does not occur. Because of this and the fact that it is not necessary to return the cap manually to the second non-engaged state, excellent operability is provided.

Figure 2:
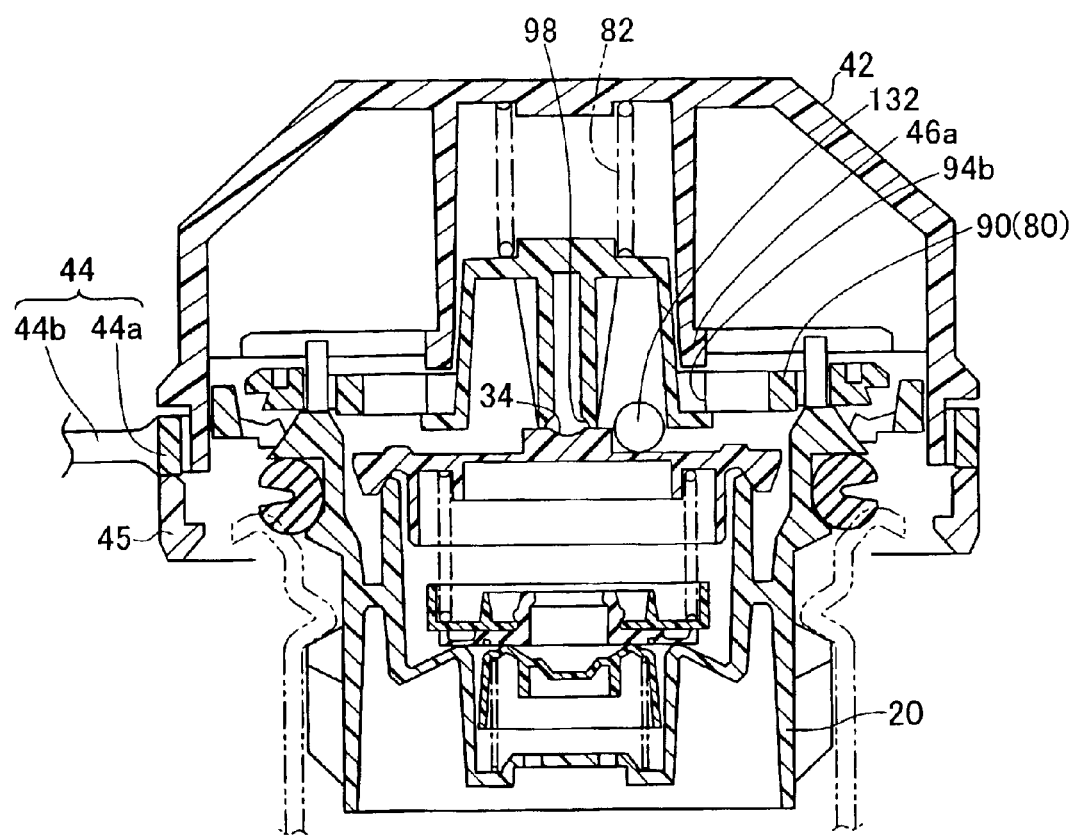
FIG. 2 shows an idle state of the cover according to the external force.

In addition, when an inertial force due to a great external force around the cap device is generated by a collision from an automobile, the torque release mechanism 130 acts to release the engagement with the torque mechanism 80. In other words, when the steel ball 132 of the torque release mechanism 130 is subjected to a predetermined or greater inertial force, as shown in FIG. 2, the ball 132 is removed from the space between the lower support surface 34 and the upper side support surface 98, the space between the handle engagement element 46a and the torque piece engagement element 94b is moved to a non-interposed state, (see FIG. 6) and the handle 42 is placed in an idle state. As a result, even if the handle 42 is subjected to the external force due to a collision, as the handle 42 goes into an idle state, and the torque mechanism 80 does not transmit the rotational torque to the casing body 20, the cap 10 ensures the high sealing properties.

Moreover, a tether 44 is mounted on the cover body 40 so that the fuel cap 10 is not mistakenly dropped when fueling takes place so that the steel ball 132 on the torque release mechanism 130 does not readily become detached other than by an external force.

Moreover, the present invention is not limited to the above-mentioned embodiment. Various embodiments are possible within the scope of the essential points of the invention. For example, the following kinds of embodiments are possible.

Figure 15:
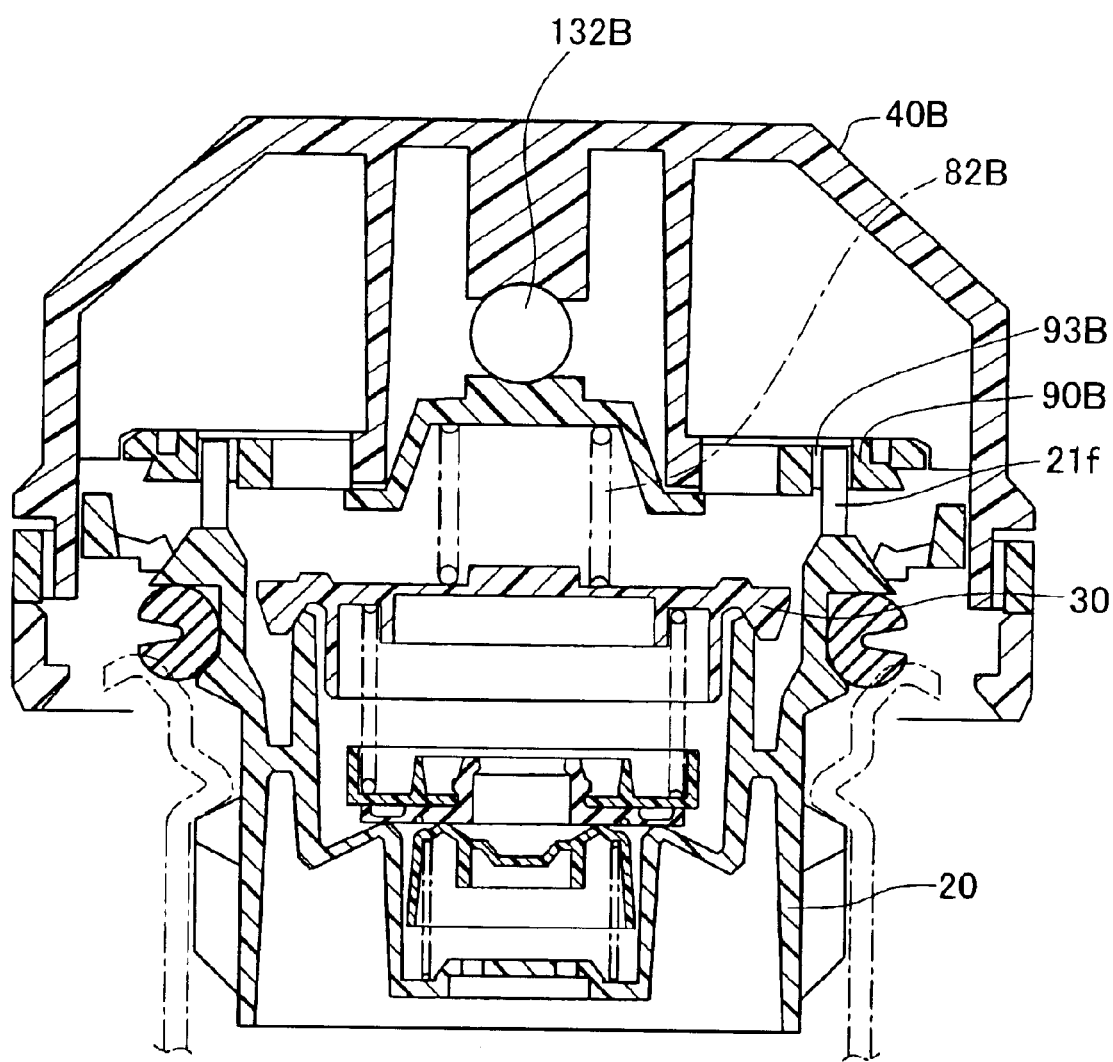
FIG. 15 is a cross sectional view showing the fuel cap according to a second embodiment of the present invention.

The torque release mechanism in the first embodiment given above was configured so that the cover and the torque plate are engaged or disengaged. However, a second embodiment may be configured so that the torque plate 90B and the casing body 20 are engaged or released, as shown in FIG. 15. In FIG. 15, the steel ball 132B is interposed between a cover body 40B and a torque plate 90B, and a spring 92B is made to span the space between the torque plate 90B and an inside cover 30. This configuration makes it possible for a main body rib 21f to be attached and detached from the rib guide 93B of the torque plate 90B when the steel ball 132B is detached by an external force. This type of torque release mechanism can be set in place in a variety of ways and may have a variety of configurations.

Figure 16:
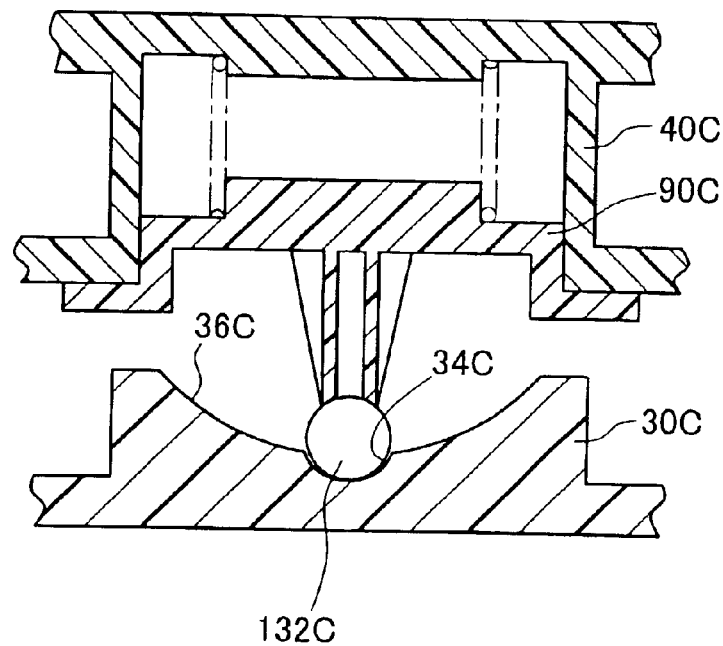
FIG. 16 is a cross sectional view showing the fuel cap according to a third embodiment of the present invention.
Figure 17:
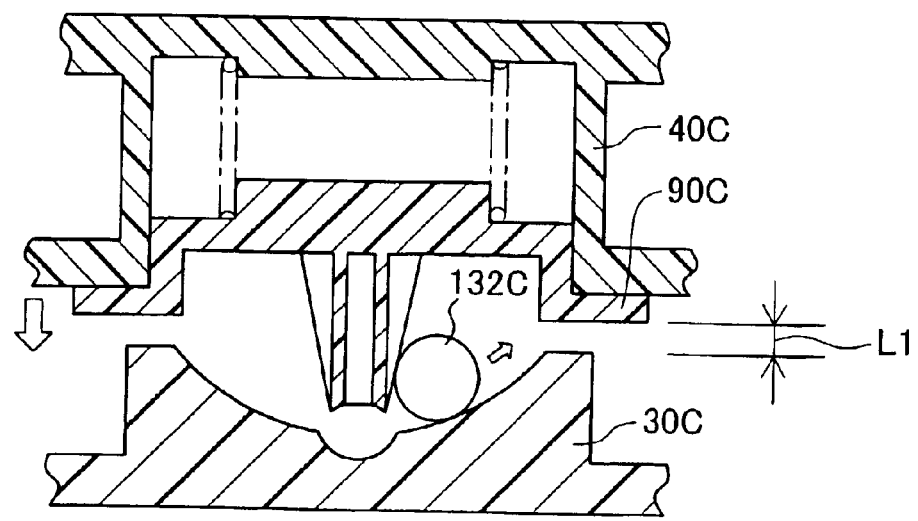
FIG. 17 shows the action of the third embodiment of the present invention.
Figure 18:
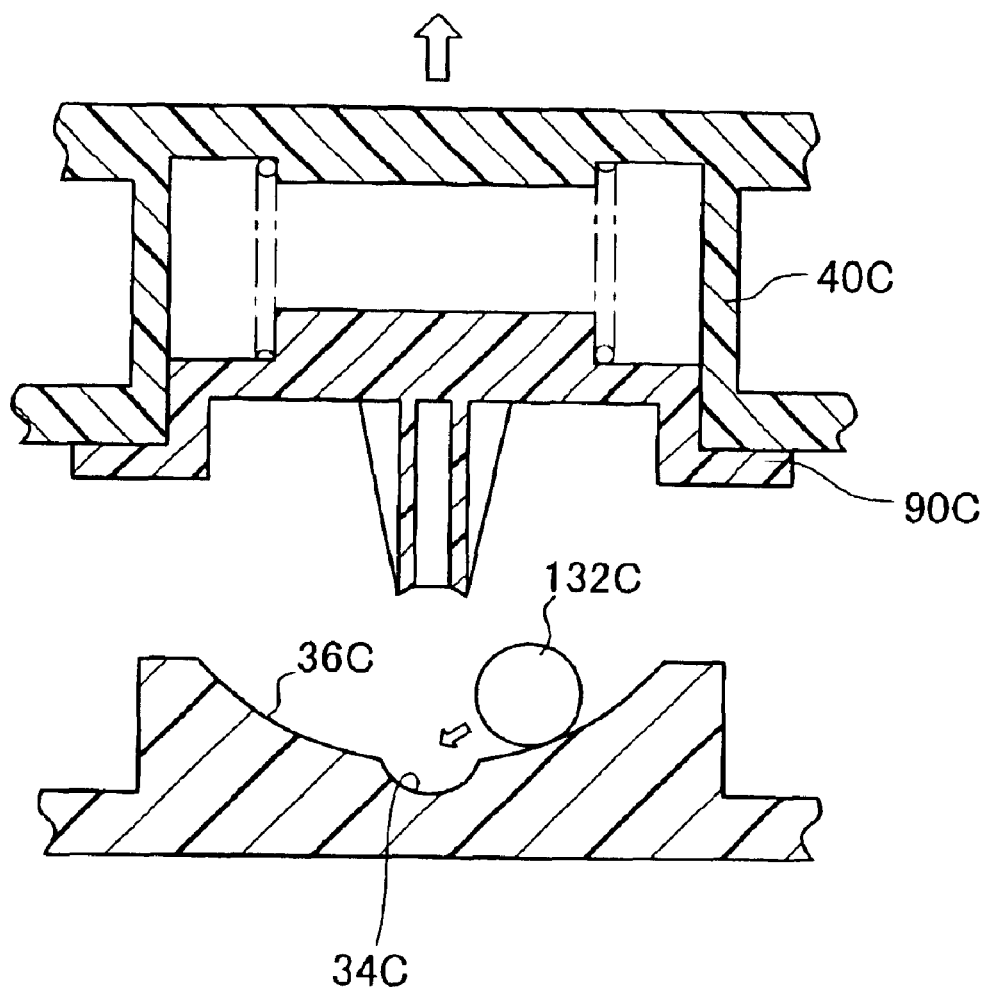
FIG. 18 shows the operations for returning from the torque non-transmission state, of the third embodiment of the present invention.

FIG. 16 is a sectional view of a main parts of the fuel cap which indicates a third embodiment of the present invention. In FIG. 16, a locating recess 34C for retaining the steel ball 132C is formed on the semi-spherical surface in the middle of the upper part of the inside cover 30C. A guide surface 36C is also formed around the locating recess 34C. The guide surface 36C is configured to be punch bowl so that the steel ball 132C moves the locating recess 34C. FIG. 17 is a sectional view of the main parts of the fuel cap when transmission torque release mechanism is in a torque release state. FIG. 18 shows the operations for returning from the torque non-transmission state.

In the torque non-transmission state, the space L1 between the guide surface 36C and the torque plate 90C is made narrow so that the steel ball 132C is retained between them. When the external force on the fuel cap increases and the steel ball 132C is detached from the locating recess 34C, the space between the torque plate 90C and the guide surface 36C becomes narrower so that the steel ball 132C is retained between these.

Then, when the torque plate 90C is lifted up along with the cover body 40C, the steel ball 132C moves along the guide surface 36C and returns to the locating recess 34C. As a result, even when a large external force is mistakenly applied when the fuel cap is attached and detached and transmission torque release mechanism goes into a torque non-transmission state, it can be easily returned to the original state.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A tank cap configured to open and close a tank opening and engage with an opening engagement element disposed on a circumference of the tank opening, the tank cap comprising:
   a casing main body, which is configured to seal the tank opening, the casing main body including a casing engagement element configured to engage with the opening engagement element via rotation of the casing main body by a predetermined angle;
   a handle rotatably mounted on the casing main body;
   a coupling mechanism including a torque mechanism and a transmission torque release mechanism, which are interposed between the handle and the casing main body,
   wherein the torque mechanism has a torque transmission state in which the torque mechanism transmits a rotational torque applied to the handle to the casing main body within a predetermined range via engagement between the casing main body and the handle; and
   the transmission torque release mechanism has an interposing member, the interposing member being configured to release the engagement of the torque mechanism to shift the torque mechanism from the torque transmission state to a torque non-transmission state in which the interposing member places the handle against the casing main body in an idle state, when the interposing member is subjected to a predetermined or greater inertial force resulting from an external force except user's force for operating the cap,
   wherein the torque mechanism includes:
      a handle engagement element disposed on a lower portion of the handle;
      a torque plate interposed between the handle and the casing main body, the torque plate having a plate engagement element configured to engage with the handle engagement element; and
   wherein the interposing member is configured such that the handle engagement element and the plate engagement element are engaged in the torque transmission state, and the handle engagement element and the plate engagement element are disengaged in the torque non-transmission state, the interposing member being a ball.

2. The tank cap in accordance with claim 1, wherein the transmission torque release mechanism includes a locating recess formed on an upper portion of the casing main body for supporting a lower portion of the ball and a support portion formed on a lower portion of the torque plate for supporting an upper portion of the ball, the locating recess and the support portion being configured to hold the ball in the torque transmission state and to release the ball in the torque non-transmission state.

3. The tank cap in accordance with claim 1, wherein the transmission torque release mechanism is configured such that the ball is maintained in a space between the torque plate and the casing main body when the ball is released from the locating recess.

4. The tank cap in accordance with claim 1, wherein the transmission torque release mechanism includes a guide curved member formed around the locating recess, the guide curved member being configured to return the ball on the locating recess when the interval between the torque plate and the casing main body is increased from that in the torque transmission state.

* * * * *